United States Patent [19]

Binder

[11] 4,267,779
[45] May 19, 1981

[54] MECHANICALLY TRACKABLE ROAD VEHICLE

[75] Inventor: Hellmuth Binder, Stuttgart, Fed. Rep. of Germany

[73] Assignee: Daimler-Benz Aktiengesellschaft, Stuttgart, Fed. Rep. of Germany

[21] Appl. No.: 84,613

[22] Filed: Oct. 15, 1979

[30] Foreign Application Priority Data

Oct. 13, 1978 [DE] Fed. Rep of Germany ....... 2844626

[51] Int. Cl.³ ............................................. B61F 9/00
[52] U.S. Cl. .................................. 104/247; 104/119; 105/144; 180/131
[58] Field of Search ............ 104/118, 119, 242, 244.1, 104/245, 247; 105/141, 144, 165, 167, 215 R; 180/79, 131; 280/113, 117, 445, 474, DIG. 14

[56] References Cited

U.S. PATENT DOCUMENTS 4,183,304  1/1980  Förster ............................. 104/247

FOREIGN PATENT DOCUMENTS 2628218  1/1978  Fed. Rep. of Germany ........ 180/79
2719705  11/1978 Fed. Rep. of Germany ...... 180/131
2743077  4/1979  Fed. Rep. of Germany ........ 180/79
2355703  1/1978  France ................................. 104/247

Primary Examiner—Randolph A. Reese
Attorney, Agent, or Firm—Craig and Antonelli

[57] ABSTRACT

A bi-mobile mechanically trackable road vehicle which includes a steerable axle having steerable wheels and at least one additional unsteerable axle having unsteerable wheels. Tracking transverse guide rollers are provided in an area of the vehicle axles. The non-steerable axle is mounted in the manner of a turntable so as to be freely pivotable about a vertical axis with an arrangement being provided for automatically selectively rocking the at least one non-steerable axle in an exact transverse position when the vehicle leaves a guide track and for automatically unlocking the non-steerable axle upon an entry of a vehicle onto the guide track. At least one of the transverse guide rollers is mounted so as to be freely transversely displaceable within mechanical preset limits. A coupling arrangement is provided for coupling the automatic locking and unlocking arrangement with the at least one transverse guide roller so that the non-steerable axle is unlocked when the transverse guide roller is in an operating position and locked when the transverse guide roller is in an inoperative position.

39 Claims, 6 Drawing Figures

MECHANICALLY TRACKABLE ROAD VEHICLE

The present invention relates to a road vehicle and, more particularly, to a mechanically trackable road vehicle which includes a steerable axle with steerable lockable wheels mounted thereon and at least one non-steerable axle having non-steerable wheels mounted thereon and with tracking transverse guide rollers with vertical rolling surfaces provided in an area of the vehicle axles, mounted thereon at least indirectly, in front of the corresponding axle housings, whereby the axles equipped with the non-steerable wheels, preferably the rear axles, are mounted in the manner of a turntable so that they are free to pivot or swivel on the vehicle about a vertical axis and are lockable and unlockable in an exact transverse position by means of a transverse position locking device.

A vehicle of the aforementioned type is proposed in, for example, German Offenlegungsschrifts Nos. 26 43 324 and 27 19 705. With vehicles of such type, the pivotability or swivelability of the rear axle is provided in order to reduce the clearance requirements of the vehicles when such vehicles are negotiating curves. Since one goal of the tracked mode being used for road vehicles is to maintain the space requirements for tracked travel as low as possible, in case of longer or articulated vehicles, the clearance requirements of such vehicles become especially significant when such vehicles are negotiating curves. As can be appreciated, in order for such vehicles to be dual mode, i.e., operable with guide tracks or on normal road surfaces, the mobility of the pivotable rear axle must be eliminated or blocked for trackless travel and the rear axle must be capable of being locked in an exact transverse position.

A disadvantage of the previously proposed axle locking systems resides in the fact that they must be separately unlocked when the vehicle enters the track system and must be separately locked again when the vehicle leaves the track system. This separate actuation of the locking device which must occur simultaneously with entry onto and departure from the track system may either be accomplished at the wrong time or forgotten entirely thereby resulting in considerable damage to the vehicle as well as to danger to other drivers when the vehicle is operated out of the track system on the normal roadway.

The aim underlying the present invention essentially resides in providing an automatic locking and unlocking system for a non-steerable pivotally mounted axle of a mechanically trackable vehicle which ensures the locking and unlocking functions at the proper time so that the locking and unlocking cannot be forgotten.

In accordance with the present invention, at least one of the transverse guide rollers is mounted to be free to travel transversely within mechanically pre-set limits and is elastically tensioned to move from the operating position which is effective during tracked travel into the other end position within movement limits. A part which moves along with the transverse guide roller can move transversely within certain limits with such part being coupled with a transverse position locking device in such a manner that, when the at least one transverse guide roller is in the operating position, the pivotable rear axle is unlocked and the rear axle is locked when the at least one guide roller is in the other end position.

Advantageously, in accordance with the present invention, the at least one transverse guide roller free to travel transversely within certain predetermined limits is provided on each side of the vehicle and, preferably, such transverse guide rollers are associated with the pivotable or swivelable axle.

Advantageously, the transverse guide rollers are mounted in pairs at each wheel of the unsteerable axle in front of and behind the wheel as viewed in the normal direction of travel. The transverse guide roller which is free to travel transversely within certain predetermined limits is preferably disposed forwardly of the wheel as viewed in the direction of travel of the vehicle.

Preferably, the transverse guide rollers in the construction of the present invention are disposed on both sides of the vehicle in such a manner that the rolling surface of the transverse guide rollers laterally projects beyond the outside contour of the associated wheels.

In accordance with further features of the present invention, two trailing links, extending along the longitudinal axis of the vehicle and being located approximately symmetrical relative to a center plane of the vehicle, have their ends articulated at least indirectly to articulation elements which include an axle housing of the pivotable rear axle and the vehicle frame or the like whereby the trailing links have one end articulated to an equalizer which equalizer is mounted on a corresponding articulating element and is capable of pivoting relative to the articulating element about a vertical pivot axis which is located at a center plane of the vehicle. The transverse position locking device of the present invention is functionally disposed between the equalizer and the corresponding articulating element and is so designed that, when locked, relative swiveling between the equalizer and articulating element is blocked.

In accordance with the present invention, a pair of bending locks subject to compressive force are provided with the locks being disposed in a vicinity of the ends of the equalizer between the equalizer and the articulating element. The locks are adapted to be brought into a locking extended or elongated position or a non-locking bent position with play by means of stops or the like coupled with an actuation system for the transverse position locking device.

The bending lock in accordance with the present invention may include a two-element bending element chain whose two elements are articulated together in the manner of a knee joint. The elements of the bending element chain are adapted to be moved within a defined bending plane and on both sides by the elongated position of the respective elements. In an extended or elongated position, the bending element chain is disposed approximately tangentially to the pivot axis of the equalizer and is articulated on both sides to the equalizer and the articulating element. One of the articulating points of the bending element chain is non-releasably constructed while the other articulating point is designed to be only resistant to comprssive force but is adapted to be released upon the application of a tensile force.

In order to limit the outward bending of the knee joint articulating the elements of the element chain together, in accordance defined end positions, is disposed within an area of the knee joint within the bending plane.

Moreover, in the bending plane, a force storing or operating element such as, for example, a spring or the like, is disposed on the knee joint so as to cause it to be forced against the stop 27.

In accordance with the present invention, the stop 27, which is adapted to be coupled with the actuation system of the transverse position locking device, is held in one end position, i.e., the locked position, approximately in the position of the knee joint which corresponds to an extended or elongated position of the bending element chain and is held in the other end position, i.e, the unlocked position, with the knee joint in a position which is bent outwardly against the direction of a force from the force-storing device or operating element.

Advantageously, the stops of the present invention may be in the form of pivotable lifters which are connected by a multi-armed lever and a link chain as well as a Bowden cable with the transversely displaceable transverse guide roller.

In the locked position of the stop of the present invention, the stop is displaced slightly relative to the position corresponding to the elongated position of the knee joint in a direction of action or force of the force-storing device or operating element.

Furthermore, in accordance with the present invention, the releasably constructed articulation point between the bending element chain and the equalizer or the articulation element includes a guide element which is prismatically guided in the equalizer of articulation element approximately in a direction of the extended bending element chain with the depth of penetration of the guide element being limited by an adjustable stop.

Advantageously, the equalizer of the present invention is pivotably mounted on the vehicle frame or the like and the bending element chain is non-releasably articulated on the equalizer and releasably articulated on the vehicle frame. Furthermore, the lifter which supports the movable stop is also articulated on the equalizer.

The force storing elements for the knee joint of the bending element chain of the present invention are preferably constructed as two concentric coil compression springs.

Accordingly, it is an object of the present invention to provide an axle locking arrangement for mechanically trackable vehicles which avoids, by simple means, shortcomings and disadvantages encountered in the prior art.

Another object of the present invention resides in providing an axle locking arrangement for a mechanically trackable vehicle which ensures an automatic locking and unlocking of the axle when the vehicle enters and leaves a track system.

A further object of the present invention resides in providing an axle locking arrangement for a mechanically trackable vehicle by which a reliable mechanical zero play positive locking can be achieved.

Yet another object of the present invention resides in providing an axle locking arrangement for a mechanically trackable vehicle which ensures a locking of the axle in an exact transverse position for off track use of the vehicle.

A still further object of the present invention resides in providing an axle locking arrangement for a mechanically trackable vehicle which functions reliably under all operating conditions.

Another object of the present invention resides in providing an axle locking arrangement for a mechanically trackable vehicle which enhances the overall safe operation of the vehicle both on and off the track system.

These and other objects, features, and advantages of the present invention will become more apparent from the following description when taken in connection with the accompanying drawings which show, for the purposes of illustration only, one embodiment in accordance with the present invention, and wherein.

Figure 1:
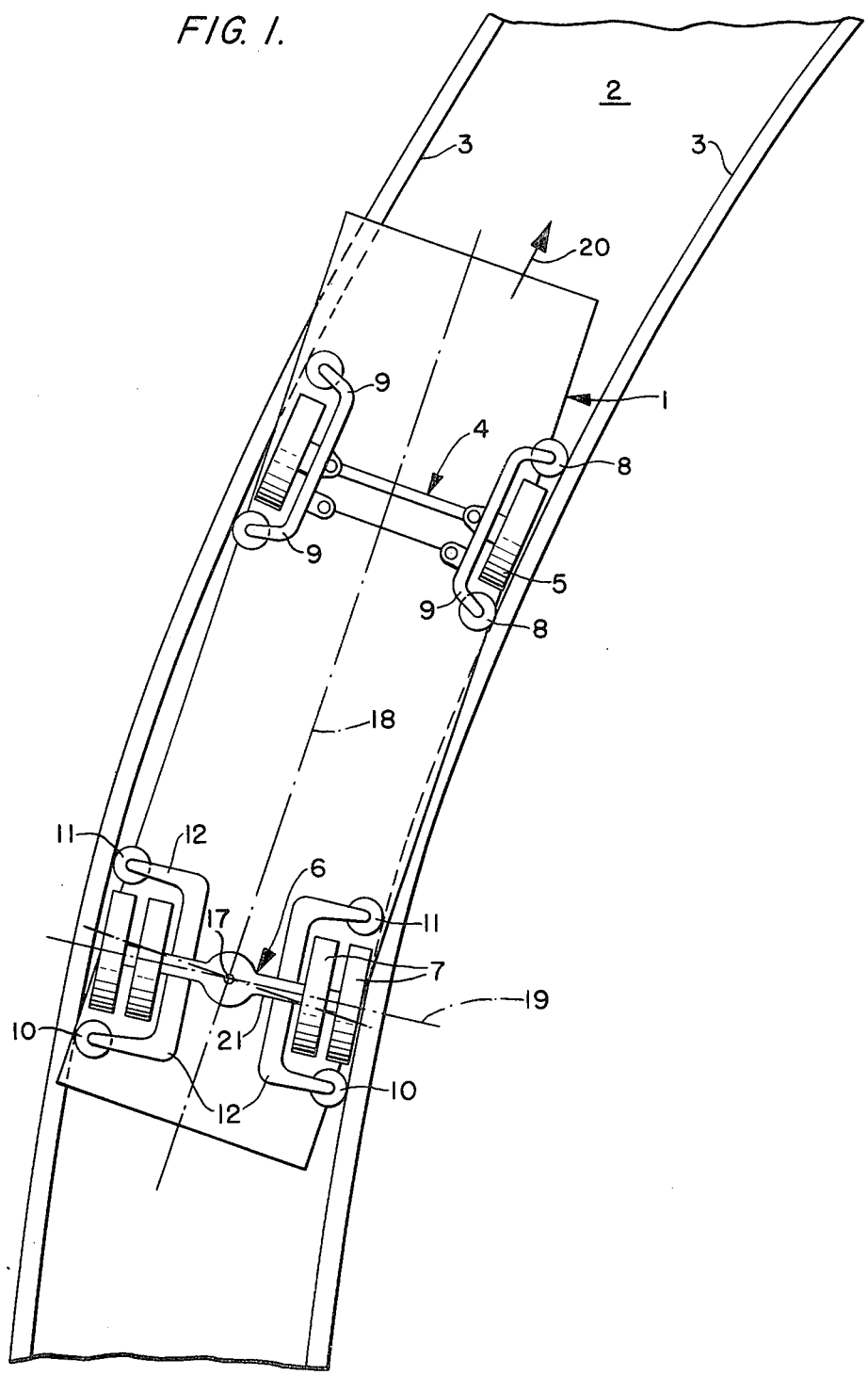
FIG. 1 is a top schematic view of a mechanical trackable road vehicle utilizing the axle locking arrangement in accordance with the present invention with the vehicle traversing a curve.

Referring now to the drawings wherein like reference numerals are used throughout the various views to designate like parts and, more particularly, to FIG. 1, according to this Figure, a dual mode vehicle generally designated by the reference numeral 1 is adapted to travel both in a trackless mode on a normal road as well as in a tracked mode on a trough-like track or guideway 2 provided with laterally mounted transverse guide edges 3. The vehicle 1 includes a steerable front axle generally designated by the reference numeral 4 with steerable lockable wheels 5 as well as a rear axle generally designated by the reference numeral 6. The rear axle 6 includes an axle housing 21 and the axle 6 is non-steerable but pivotably mounted at the vehicle 1 so as to be pivotable about a centrally located vertical pivot axis 17. Dual wheels 7 are mounted on and guided by the axle 6 with the wheels 7 being non-steerable relative to the rear axle 6.

For tracking purposes, in the illustrated embodiment, transverse guide rollers 8, 10, 11 are disposed on both sides of the vehicle 1 in front of and behind each vehicle 5, 7. The guide rollers 8, 10, 11 are held in a constant relative position with respect to the wheel plane at the outer ends of mounting arms 9, 12. The transverse guide rollers 8, 10, 11 together with the transverse guide edges 3 of the track 2 accomplish the lateral guidance of the vehicle 1 when the vehicle is used in a tracked mode.

The pivotability or swivelability of the rear axle 6 enables the vehicle 1 to follow the track 2 at both front and rear as if on rails and to traverse curves with the smallest possible clearance requirement. When negotiating curves, the rear transverse guide rollers 10, 11 adjust the rear axle 6 in the radial direction 19 at an angle to the longitudinal axis of the vehicle 1.

Figure 2:
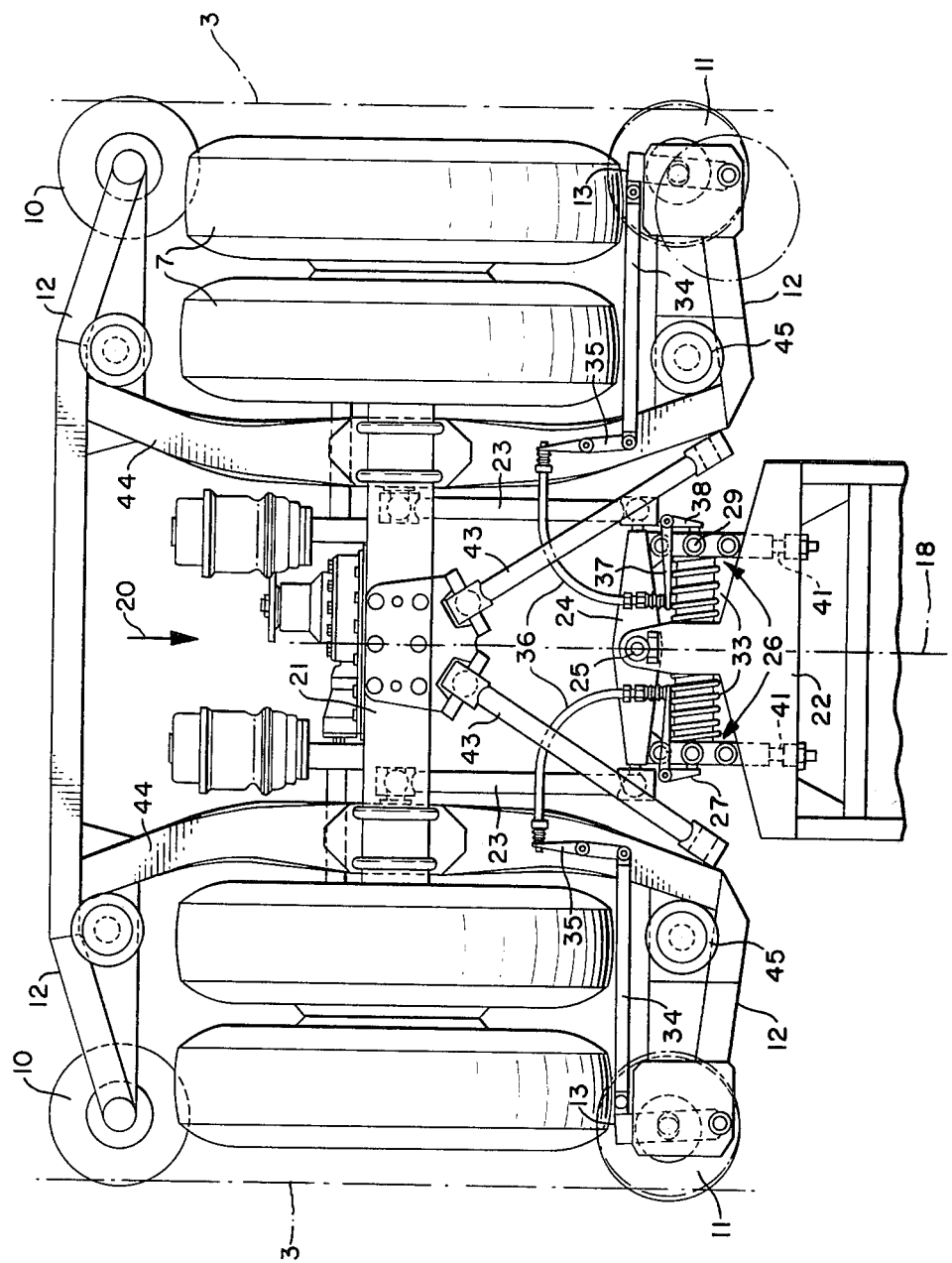
FIG. 2 is a top view of a rear axle arrangement for the vehicle of FIG. 1.
Figure 3:
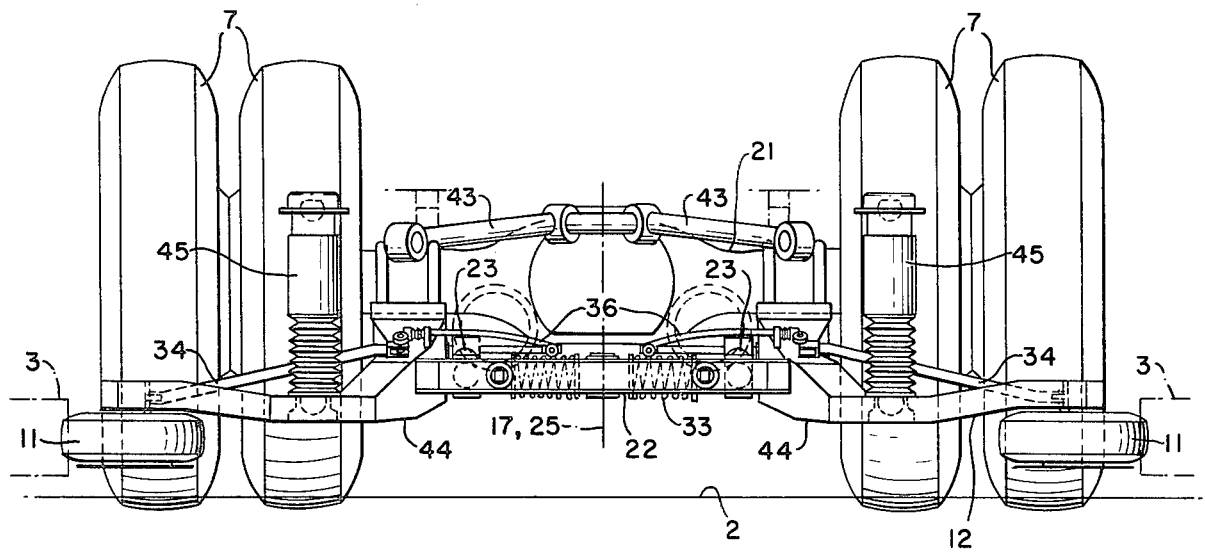
FIG. 3 is a front view of the rear axle of FIG. 2.
Figure 4:
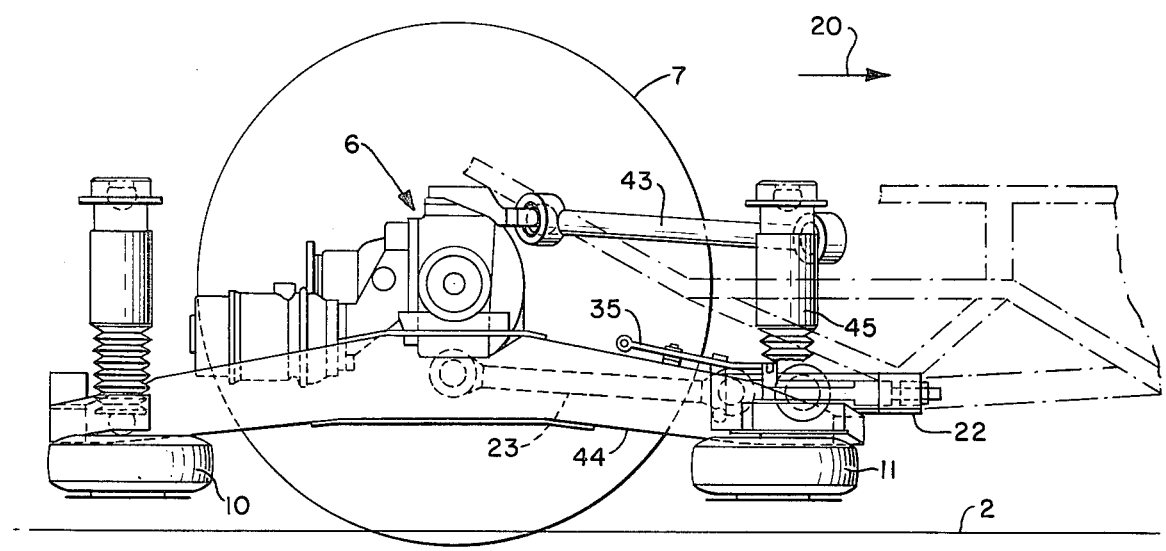
FIG. 4 is a side view of the rear axle of FIG. 2.

As shown in FIGS. 2-4, the axle housing 21 of the rear axle 6 is mounted to a spring support 44. The spring support 44 is held relative to the vehicle body by a spring/shock absorber unit such as, for example, a so-called telescopic strut 45. Ball joints are provided at the ends of the telescopic struts 45 which ball joints permit the telescopic struts 45 to assume a sloping position with respect to the rear axle 6 as the rear axle 6 pivots. Mounting arms 12 for the transverse guide rollers 10, 11 are likewise mounted on the spring support 44.

The axle housing 21 of the rear axle 6 is articulated to the vehicle frame 22 in a vertically movable fashion by way of a pair of rods 43. The pair of rods 43 are angularly disposed with respect to the longitudinal center plane of the vehicle 1 so as to result in a triangular disposition of the rods 43. One end of each of the rods 43 is articulated relatively high up on the axle housing 21 with an inner section of the longitudinal axes of the triangularly disposed pair of rods 43 being located at approximately the position of the central pivot axis 17 of the rear axle 6. The triangularly disposed pair of rods 43 are intended to guide the rear axle 6 laterally relative to the vehicle frame 22.

Trailing links 23, which are disposed symmetrically parallel to the longitudinal axis of the vehicle 1 are attached relatively far down on the axle housing 21. The purpose of the trailing links 23 is to ensure the transverse positioning of the vehicle rear axle 6. The pair of rods 43 and the trailing links 23 have the common goal of conducting the acceleration and deceleration torques of the powered and brake rear axle 6 into the vehicle frame 22.

The trailing links 23 which serve to assure the transverse positioning of the rear axle 6 are not supported directly on the vehicle frame but rather are supported by way of a pivotable or swivelable equalizer 24. The equalizer 24, in turn, is mounted to the vehicle frame 22 by a vertically extending pivot axle 25 located in the longitudinal center plane of the vehicle 1. This or a similar arrangement wherein the equalizer 24 is pivotably articulated to the rear axle housing 21 is necessary during tracked travel of the vehicle 1 in order to allow the rear axle 6 to pivot and also to be able to conduct acceleration and deceleration torques reliably into the vehicle frame 22. The equalizer 24 in the illustrated embodiment always moves together with the rear axle 6 relative to the vehicle frame 22 during a tracked travel of the vehicle 1.

During trackless travel of the vehicle 1, the pivotability of the equalizer 24 relative to the vehicle frame 22 must be eliminated and/or blocked at a position which corresponds to the exact transverse position of the rear axle 6. For this purpose, a transverse locking device is provided for the rear axle 6 which locking device is described more fully hereinbelow.

Figure 6:
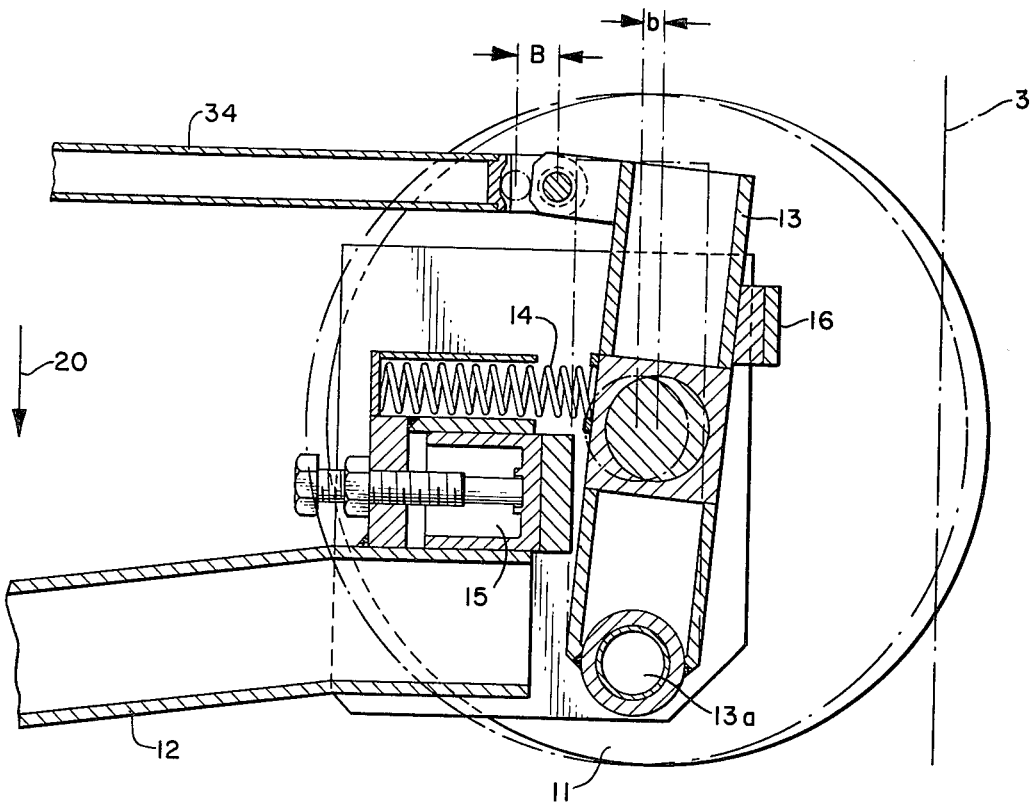
FIG. 6 is a further enlarged detailed view of the rear axle of FIG. 2 illustrating an automatic actuation of the locking arrangement of the present invention.

To permit an automatic actuation of the transverse position locking device, at least one of the transverse guide rollers 11, located toward the front of the rear axle 6, as viewed in a normal travel direction 20 of the vehicle 1, is mounted so that it is free to travel transversely by a slight negligible amount b on the mounting arm 12 as shown most clearly in FIG. 6. The transverse guide roller 11 is mounted at the center of a rocker arm 13 which is pivotable about a vertical pivot axis 13a. The rocker 13 is capable of swinging back and forth between an inner adjustable stop 15 and an outer stop 16 and is adapted to be tensioned against the outer stop 16 by a spreader spring 14. The pivot axis 13a of the rocker 13 precedes the transverse guide roller 11 in the normal direction of travel 20 of the vehicle 1.

An actuating rod 34 for actuating the transverse position locking device is articulated to the rear end of the rocker 13. The point of articulation of the actuating rod 34 to the rocker 13 is twice the distance from the pivot axis 13a as compared with the mid-point of the transverse guide roller 11 so that twice the stroke is available as a useable actuating distance B for the transverse position locking system as compared with the travel distance b of the transverse guide roller 11.

When the transverse guide roller is forced outwardly, the transverse position locking device is locked and the rear axle 6 is blocked or locked in an exact transverse position for enabling the vehicle to be operated in the trackless mode. A transistion of this kind from the locked to the unlocked position is automatically accomplished at the proper time immediately after leaving a tracked section so that the vehicle 1 never travels with its rear axle unguided thereby preventing the vehicle from being damaged as well as preventing injury to drivers of other vehicles even if the operator of the vehicle 1 is inattentive to the locking function.

Figure 5:
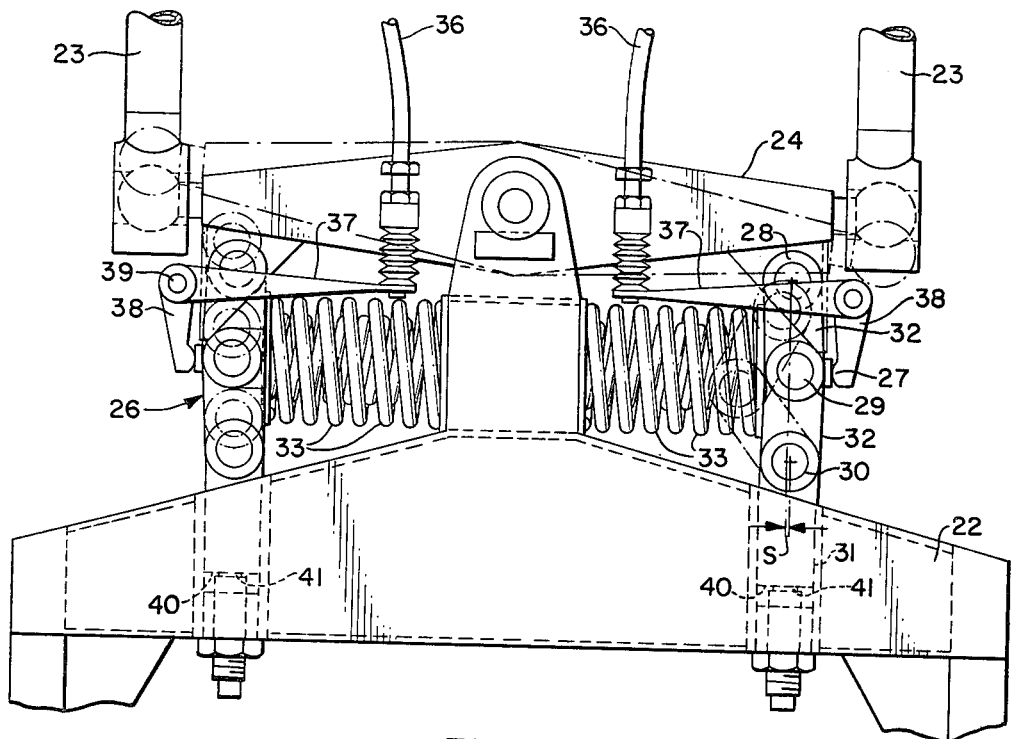
FIG. 5 is an enlarged detailed view of the rear axle arrangement of FIG. 2 illustrating a locking of an equalizer and trailing links relative to a frame of the vehicle.

FIG. 5 somewhat more clearly illustrates the transverse position locking device itself and, according to this Figure, a chain of bending elements generally designated by the reference numeral 26 is provided between the vehicle frame and the ends of the equalizer 24. The chain 26 includes two elements 32 connected by a pivot or articulation means 28 with the equalizer 24 and by a pivot or articulation means 30 with the vehicle frame 22. The pivot means 28 of the equalizer 24 is non-releasable and can be subjected to both tensile and compressive forces while the pivot or articulation means 30 of the vehicle frame 22 is resistant to compressive forces but is releasable when subjected to predetermined tensile forces. The pivot or articulation means 30 is mounted on a guide element 31 which is guided prismatically in the direction of the extended or elongated chain 26 in a parallel displaceable manner within the vehicle frame 22.

An end 40 of the guide element 31 strikes an adjustable stop screw 41 which can be locked in position by a lock nut 42. The stops 41 are adjusted so that when the two element chains are bent into an inserted position, the ends 41 of the guide elements 32 fit snugly against the stops 41.

The two elements 32 of the bending element chain 26 are connected together by a knee joint with the three articulation or pivot means 28 and 30 as well as the knee joint 29 defining a bending plane for the bending element chain 26 which is parallel to the plane of the drawing. Each bending element chain 26 has a stop associated therewith in an area of the knee joint 29. The stop 27 is located on the outside of the illustrated embodiment with the purpose of the stop 27 being to limit the outward bending path of the knee joint 29.

A pair of concentric coil compression springs 33 are arranged on an inner side of the knee joint 29. The coil compression springs 33 act on the knee joint 29 through a spring plate and have their respective opposite ends abutting the vehicle frame 22 at the center thereof. The stop 27 is connected by an actuating arrangement of the locking device, described in greater detail hereinbelow, whereby, upon actuation of the transverse position locking device shown in FIG. 6, the positioning of the stop will determine the locked or unlocked state of the locking device.

In FIG. 5, the position shown in solid lines is the locked state of the rear axle 6 wherein the bending element chain is held by the stop 27 on the one hand and the coil compression springs 33 on the other hand in a locking extended position in which very high compressive forces must be transmitted by the bending element chain 26 to the vehicle frame 22. Under the influence of the springs 33, equalizer 24 and with it the entire pivotable rear axle 6 automatically assumes the exact transverse position even from a pivoted state because a kneelever effect of the bending element chain 26 makes it possible to exert very high pivoting torques on the equalizer 24 in the direction of the exact transverse position. Upon approach to the elongated position ensured by the position of the stops 27, the bending element chain 26 snaps into the elongated or extended position under the influence of the springs 33, from which position it can no longer be moved under the influence of the pressure from the trailing links 23 because the elements 32 are prevented on both sides within the bending plane from bending laterally outward.

The stops 27 are adjusted in the locking position in such a manner that knee joint 29 is displaced laterally by a small amount S relative to the exact elongated position, slightly in the direction of the stop 27. When the bending element chain 26 is subjected to compression in the locked state, a slight outward bending force is exerted against the stop 27, which force is directed in the same direction as the action of the springs 33. An appropriately solid mounting for the stop 27 can therefore never allow the bending element chain 26 to bend outward and the springs 33 are relieved of the task of accepting the bending forces.

During a transition from the locked to the unlocked state of the transverse locking device, the stops 27 are displaced inwardly and the bending element chain 26 is brought into an inwardly bent position. From this bent position, the bending element chain 26 can easily be compressed to a slight extent even against the force of the springs 33. The bending element chain 26 opposite the compressed bending element chain 26 can be moved away from the corresponding stop 41 together with the guide element 31. The pivot point of the stop 27 or of the corresponding pivotable lifter 38 on the equalizer permits the stop 27 to participate in the corresponding lifting and swiveling movement so that the stop 27 remains essentially always in a vicinity of the knee joint 29. The provision of two concentric springs 33 assures the achievement of the softest possible spring characteristic even at a sufficiently high restoring force. The bent bending element chain 26, with play, forces the corresponding coil compression springs 33 together. The forces required for this must be applied by the lateral guide edges 3 of the track 2 and by way of the transverse guide rollers 10, 11 and mounting arms 12 as well as by trailing links 23 acting on the equalizer 24.

By virtue of the above-noted features of the transverse position locking system, advantageously, on the one hand, a reliable mechanical zero-play positive lock can be achieved between the equalizer 24 on the one hand and the vehicle frame 22 on the other and, also, in an equally reliable manner, automatic return of the rear axle 6 to the locked state is possible. Moreover, the automatic locking and unlocking functions cannot adversely be affected by the influence of dirt or by the specific points in the articulation system which are generally subject to wear for any wear can readily be compensated for by the adjusting stops 41. The coupling of the actuator for the transverse position locking device of FIG. 6 with the transverse position locking device of FIG. 5 is accomplished by the actuator or push rod 34, a reversing actuator lever 35 mounted on the spring support, a Bowden cable 36, and a rectangular or double-armed lever 37 pivotably mounted on the equalizer 24 at a bearing 39. The stop lifter which supports the stop 27 is arranged on a shorter arm or part of the lever 37. While such an arrangement for actuating the locking device may appear rather complicated at first, it has been selected in order to keep the core of the Bowden cable 36 always under tension. When a transverse guide roller 11 moves inward, the stop 27 also moves inward whereby the transverse position locking device 23–33 is transformed to the unlocked state with the bending element chains 26 being bent inward with play. The continuous action of pressure exerted by the transverse guide edges 3 of the guide track 2 during track travel of the vehicle 1 causes the unlocked state to be constantly maintained despite the restoring effect of the springs 33, 14.

When the transverse guide edges 3 of the guide track 2 are eliminated, i.e., upon a changeover to a trackless travel on a normal road surface, the actuating rod 34, levers 35 and 37 as well as the stop lifter 38 and actuation system 13–16 are automatically changed by the spring 14 to the outer locked position shown in solid lines in FIG. 6. The locked condition of the transverse locking system 26–33 itself is accomplished by springs 33 which force the bending element chain 26, following an outwardly moving stop 27, back into the extended or elongated position even against external resistances so as to lock the equalizer 24 and rear axle 6 in the exact transverse position.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A bi-mobile mechanically trackable vehicle adapted to be driven with or without a guide track, the vehicle including a steerable axle having steerable wheels mounted thereon, at least one additional non-steerable axle having non-steerable wheels mounted thereon, a plurality of tracking transverse guide roller means for guiding the vehicle along the guide track, means for at least indirectly mounting the transverse guide roller means at the respective axles in an area of the respective wheels of the vehicle, means for mounting the at least one non-steerable axle on the vehicle so as to be freely pivotable about a vertical axis, and means for selectively locking the at least one non-steerable axle in an exact transverse position for driving without a guide track and for unlocking the at least one non-steerable wheel from said transverse position, characterized in that the means for at least indirectly mounting the transverse guide roller means includes means for enabling at least one of the transverse guide roller means to be transversely displaceable within preset limits, means are provided for elastically tensioning said at least one guide roller means so as to move the same from a first end position defining an operating position to a second end position, said first and second end positions are within the preset limits, and in that means movable with the at least one transverse guide roller means are provided for coupling the transverse guide roller means with the selective locking and unlocking means so as to automatically unlock the at least one non-steerable axle wheel when the at least one transverse guide roller means is in the operating position and for automatically locking the at least one non-steerable axle wheel when the transverse guide roller means is in the second end position.

2. A vehicle according to claim 1, characterized in that the at least one non-steerable axle is a rear axle of the vehicle.

3. A vehicle according to claim 2, characterized in that the transverse guide roller means are provided with vertical rolling surfaces.

4. A vehicle according to claim 3, characterized in that the at least one transverse guide roller means is disposed forwardly of the wheel of the vehicle as viewed in a normal direction of travel of the vehicle.

5. A vehicle according to claim 1, characterized in that at least two transverse guide roller means are mounted so as to be transversely displaceable within the preset limits, with said last mentioned guide roller means being disposed on respective lateral sides of the vehicle.

6. A vehicle according to claim 5, characterized in that the at least two transverse guide roller means are mounted at the non-steerable axle.

7. A vehicle according to claim 5, characterized in that one of the at least two transverse guide roller means is disposed forwardly of the respective non-steerable wheels of the vehicle as viewed in a normal travel direction of the vehicle, and in that at least one further transverse guide roller means is disposed rearwardly of the respective non-steerable wheels, as viewed in a normal travel direction of the vehicle.

8. A vehicle according to claim 7, characterized in that each of the transverse guide roller means projects laterally outwardly beyond an outer contour of the associated wheel.

9. A vehicle according to claim 7, characterized in that a pair of trailing link means extend longitudinally of the vehicle and are disposed approximately symmetrically with respect to a longitudinal center plane of the vehicle, means are provided for pivotally mounting a first end of the respective link means at least indirectly to a first member forming one of a portion of the non-steerable axle and a frame of the vehicle, an equalizer means is provided, and in that means are provided for mounting a second end of the respective trailing link means to a second member forming the other of the portion of the non-steerable axle and the frame of the vehicle so as to be pivotable about a vertical axis located substantially in the longitudinal center plane of the vehicle.

10. A vehicle according to claim 9, characterized in that the means for selectively locking and unlocking the at least one non-steerable axle is functionally disposed between the equalizer means and the second member, and in that the selective locking and unlocking means block relative pivotal movement between the equalizer means and the second member when the at least one non-steerable axle is in a locked position.

11. A vehicle according to claim 10, characterized in that the blocking means includes bending lock means adapted to be subjected to compressive force, said bending lock means are disposed in an area of respective ends of the equalizer means between the equalizer means and the second member, and in that said coupling means includes stop means cooperable with the bending lock means for displacing the bending lock means to and from a bent unlocked position to an extended locked position.

12. A vehicle according to claim 11, characterized in that each bending lock means includes a chain of at least two bending elements, and in that joint means are provided for articulatingly connecting the bending elements to each other.

13. A vehicle according to claim 12, characterized in that the chain of bending elements are movable within a defined bending plane and on both sides of the bending plane by an extended positioning of the bending elements.

14. A vehicle according to claim 13, characterized in that means are provided for articulatingly connecting ends of the chain of bending elements to the equalizer means and the second member, respectively, and in that the chain of bending elements are disposed approximately tangentially to the pivot axis of the equalizer means when the chain of bending elements is in the extended position.

15. A vehicle according to claim 14, characterized in that one of the connecting means for articulatingly connecting the respective ends of the chain of bending elements is constructed so as to be non-releasable, and in that the other connecting means for articulatingly connecting the respective ends of the chain of bending elements is constructed so as to be only resistant to compressive force but releasable upon an application of tensile force.

16. A vehicle according to claim 15, characterized in that said stop means is movable between two defined end positions within the bending plane, and in that said stop means is disposed within an area of said joint means for limiting an outward bending thereo.

17. A vehicle according to claim 16, characterized in that a force storing means is disposed in an area of the joint means for normally urging the joint means against said stop means.

18. A vehicle according to claim 17, characterized in that means are provided for holding the stop means in an end position corresponding to the locked position approximately at a position of the joint means which corresponds to an extended position of the chain of bending elements and for holding the stop means in a second end position corresponding to an unlocked position with the joint means being displaced outwardly against a force of the force storing means.

19. A vehicle according to claim 18, characterized in that the coupling means further includes a multi-armed lever means, a further lever means operatively connected with one arm of the multi-armed lever means and with a link means operatively connected with displaceable transverse guide roller means, and in that a cable means operatively connects the further lever means with said one arm of the multi-armed lever means, said stop means is constructed as a lifter arranged on a second arm of the multi-armed lever.

20. A vehicle according to claim 19, characterized in that the stop means is adapted to be displaced slightly relative to the position of the joint means which corresponds to an extended position of the chain of bending elements in a direction of the force of the force storing means in a locked position by said coupling means.

21. A vehicle according to claim 20, characterized in that the releasable connecting means for the bending elements includes a guide means interposed between the chain of bending elements and one of said first and second members, said guide means is prismatically guided in one of said first and second members, and in that an adjustable stop means is provided for limiting a depth of penetration of the guide means.

22. A vehicle according to claim 21, characterized in that the equalizer means is pivotably mounted on the frame of the vehicle.

23. A vehicle according to claim 22, characterized in that the non-releasable connecting means for the chain of bending elements is arranged between the end of the chain of bending elements and the equalizer means, and in that the releasable connecting means is arranged between the other end of the chain of bending elements and the frame of the vehicle.

24. A vehicle according to claim 23, characterized in that the lifter is articulated on the equalizer means.

25. A vehicle according to claim 24, characterized in that the force storing means includes two concentrically disposed coil compression springs.

26. A vehicle according to one of claims 1 or 5, characterized in that a pair of trailing link means extend longitudinally of the vehicle and are disposed approximately symmetrically with respect to a longitudinal center plane of the vehicle, means are provided for pivotally mounting a first end of the respective link means at least indirectly to a first member forming one of a portion of the non-steerable axle and a frame of the vehicle, an equalizer means is provided, and in that means are provided for mounting a second end of the respective trailing link means to a second member forming the other of the portion of the non-steerable axle and the frame of the vehicle so as to be pivotable about a vertical axis located substantially in the longitudinal center plane of the vehicle.

27. A vehicle according to claim 26, characterized in that the means for selectively locking and unlocking the at least one non-steerable axle is functionally disposed between the equalizer means and the second member, and in that the selective locking and unlocking means blocks relative pivotal movement between the equalizer means and the second member when the at least one non-steerable axle is in a locked position.

28. A vehicle according to claim 27, characterized in that the blocking means includes bending lock means adapted to be subjected to compressive force, said bending lock means are disposed in an area of respective ends of the equalizer means between the equalizer means and the second member, and in that said coupling means includes stop means cooperable with the bending lock means for displacing the bending lock means to and from a bent unlocked position to an extended locked position.

29. A vehicle according to claim 28, characterized in that each bending lock means includes a chain of at least two bending elements, and in that joint means are provided for articulatingly connecting the bending elements to each other.

30. A vehicle according to claim 29, characterized in that the chain of bending elements are movable within a defined bending plane and on both sides of the bending plane by an extended positioning of the bending elements.

31. A vehicle according to claim 30, characterized in that means are provided for articulatingly connecting ends of the chain of bending elements to the equalizer means and the second member, respectively, and in that the chain of bending elements are disposed approximately tangentially to the pivot axis of the equalizer means when the chain of bending elements is in the extended position.

32. A vehicle according to claim 31, characterized in that one of the connecting means for articulatingly connecting the respective ends of the chain of bending elements is constructed so as to be non-releasable, and in that the other connecting means for articulatingly connecting the respective ends of the chain of bending elements is constructed so as to be only resistant to compressive force but releasable upon an application of tensile force.

33. A vehicle according to claim 32, characterized in that said stop means is movable between two defined end positions within the bending plane, and in that said stop means is disposed within an area of said joint means for limiting an outward bending thereof.

34. A vehicle according to claim 33, characterized in that a force storing means is disposed in an area of the joint means for normally urging the joint means against said stop means.

35. A vehicle according to claim 34, characterized in that means are provided for holding the stop means in an end position corresponding to the locked position approximately at a position of the joint means which corresponds to an extended position of the chain of bending elements and for holding the stop means in a second end position corresponding to an unlocked position with the joint means being displaced outwardly against a force of the force storing means.

36. A vehicle according to claim 28, characterized in that the chain of bending elements are movable within a defined bending plane and on both sides of the bending plane by an extended positioning of the bending elements.

37. A vehicle according to claim 36, characterized in that the coupling means further includes a multi-armed lever means, a further lever means operatively connected with one arm of a multi-armed lever means and with a link means operatively connected with displaceable transverse guide roller means, and in that a cable means operatively connects the further lever means with said one arm of the multi-armed lever means, said stop means is constructed as a lifter arranged on a second arm of the multi-armed lever.

38. A vehicle according to claim 30, characterized in that the releasable connecting means for the bending elements includes a guide means interposed between the chain of bending elements and one of said first and second members, said guide means is prismatically guided in one of said first and second members, and in that an adjustable stop means is provided for limiting a depth of penetration of the guide means.

39. A vehicle according to claim 31, characterized in that the equalizer means is pivotably mounted on the frame of the vehicle.

* * * * *